United States Patent [19]

Murschall et al.

[11] Patent Number: 5,474,820

[45] Date of Patent: * Dec. 12, 1995

[54] BIAXIALLY-ORIENTED MULTILAYER POLYOLEFIN FILM WITH A SILK-MATT FINISH, PROCESS FOR ITS PREPARATION AND USE THEREOF

[75] Inventors: Ursula Murschall, Nierstein; Angela Speith, Wiesbaden, both of Germany

[73] Assignee: Hoechst Aktiengesellschaft, Frankfurt am Main, Germany

[*] Notice: The portion of the term of this patent subsequent to Nov. 22, 2011, has been disclaimed.

[21] Appl. No.: 40,091

[22] Filed: Mar. 30, 1993

[30] Foreign Application Priority Data

Apr. 2, 1992 [DE] Germany ............... 42 10 969.8

[51] Int. Cl.⁶ ............................................. B29D 22/00
[52] U.S. Cl. ................... 428/35.7; 428/35.9; 428/349; 428/461; 428/511; 428/516; 428/910
[58] Field of Search ........................ 428/516, 349, 428/910, 35.7, 35.9, 461, 511

[56] References Cited

U.S. PATENT DOCUMENTS

| | | |
|---|---|---|
| 4,283,453 | 8/1981 | Seifried et al. . |
| 4,297,415 | 10/1981 | Ward et al. ............... 428/516 |
| 4,419,411 | 12/1983 | Park ........................... 428/516 |
| 4,522,887 | 6/1985 | Koebisu et al. ........... 428/461 |
| 4,578,316 | 3/1986 | Clauson et al. ........... 428/516 |
| 4,622,237 | 11/1986 | Lori ............................ 427/40 |
| 4,666,778 | 5/1987 | Hwo ............................ 428/412 |
| 4,855,187 | 8/1989 | Osgood, Jr. et al. ...... 428/516 |

FOREIGN PATENT DOCUMENTS

| | | |
|---|---|---|
| 236945 | 9/1987 | European Pat. Off. . |
| 0365463 | 4/1990 | European Pat. Off. . |
| 0394550 | 10/1990 | European Pat. Off. . |
| 0538746 | 4/1993 | European Pat. Off. . |
| 1145199 | 3/1969 | United Kingdom . |
| 2201407 | 9/1988 | United Kingdom . |

Primary Examiner—Edith Buffalow
Attorney, Agent, or Firm—Foley & Lardner

[57] ABSTRACT

A multilayer polypropylene film is disclosed that has at least one base layer containing polypropylene and at least one outer layer containing a mixture of two mixture components I and II. Mixture component I is essentially a polypropylene homopolymer or a copolymer of ethylene and propylene or ethylene and butylene or propylene and butylene or ethylene and another α-olefin having 5 to 10 carbon atoms or propylene and another α-olefin having 5 to 10 carbon atoms or a terpolymer of ethylene and propylene and butylene or ethylene and propylene and another α-olefin having 5 to 10 carbon atoms or a mixture of two or more of said homopolymers, copolymers and terpolymers or a blend of two or more of said homopolymers, copolymers and terpolymers, if desired mixed with one or more of said homopolymers, copolymers and terpolymers. Mixture component II is essentially an HDPE or a blend of two blend components A and B. Blend component A is essentially an HDPE. Blend component B is essentially a polypropylene homopolymer or a copolymer of ethylene and propylene or ethylene and butylene or propylene and butylene or ethylene and another α-olefin having 5 to 10 carbon atoms or propylene and another α-olefin having 5 to 10 carbon atoms or a terpolymer of ethylene and propylene and butylene or ethylene and propylene and another α-olefin having 5 to 10 carbon atoms or a mixture of two or more of said homopolymers, copolymers and terpolymers or a blend of two or more of said homopolymers, copolymers and terpolymers. The film has a silk-matt finish.

19 Claims, No Drawings

BIAXIALLY-ORIENTED MULTILAYER POLYOLEFIN FILM WITH A SILK-MATT FINISH, PROCESS FOR ITS PREPARATION AND USE THEREOF

BACKGROUND OF THE INVENTION

The present invention relates to a multilayer polypropylene film which comprises at least one base layer containing polypropylene and at least one outer layer which contains a mixture of two mixture components.

German Patent Application P 41 35 096.0 discloses multilayer polyolefin films comprising a polypropylene base layer and an outer layer made from an HDPE blend. This HDPE blend comprises HDPE and copolymers and/or terpolymers made from α-olefins and, if desired, polypropylene. The outer layer of the multilayer film has minimum sheen and maximum haze, giving the film a characteristic matt appearance.

DE-A-16 94 694 discloses multilayer films comprising biaxially-oriented polypropylene films and at least one heat-sealable layer made from an ethylene-propylene copolymer. These films have good heat-sealability, but are clear and have inadequate scratch resistance. In addition, they have unsatisfactory processing properties on high-speed packaging machines.

EP-A-0 008 904 discloses a biaxially-oriented three-layer polyolefin film that is heat-sealable on both sides, in which the base layer is formed from propylene polymers and the two heat-sealable layers are formed from heat-sealable olefin polymers. However, this polyolefin film is transparent and, in particular, has only low scratch resistance and is not printable. In addition, it is also often unsatisfactory with respect to its sliding properties with respect to high-speed packaging machines.

A further biaxially-oriented three-layer polyolefin film that is heat-sealable on both sides is disclosed in U.S. Pat. No. 4,419,411. The two heat-sealable layers in these films incorporate polysiloxane and silicon dioxide as an additive combination. The base layer essentially comprises polypropylene and contains a small amount of a monocarboxamide, which partially migrates from the base layer into the two heat-sealable layers. The multilayer polyolefin film described is said to have a particularly low coefficient of friction. This film has, in particular, the disadvantage that it is not printable.

U.S. Pat. No. 4,578,316 discloses a biaxially-oriented multilayer polyolefin film with a base layer of a polypropylene homopolymer and an outer layer of a blend of polypropylene and MDPE and/or HDPE. This polyolefin film has a low coefficient of friction together with a readily wettable surface; however, this film also has excellent optical clarity.

WO 89/10839 describes multilayer polyolefin films with a base layer of a polypropylene polymer and outer layers of either HDPE or an ethylene-propylene copolymer or a polypropylene, the film being stretched under particular temperature conditions. It has, in particular, a low coefficient of friction and good wettability, but simultaneously also high sheen and low haze.

Thus, the state of the art suggests that various applications require polypropylene films to have various properties and in particular specific combinations of individual quality features.

EP 0 367 613 discloses a multilayer film comprising a vacuole-containing polypropylene base layer and an outer, writable layer that comprises a first polymer having a melt flow index of less than or equal to 1 g/10 min and a second polymer that is incompatible with the first polymer. HDPE having a density of 0.92 to 0.97 g/m$^3$ is named as an example for the first polymer. As the incompatible polymer, a polypropylene or a copolymer or terpolymer of polypropylene is mentioned. The film has an opaque appearance, i.e., it is essentially impermeable to light. The disclosure states that the film is given a matt appearance by providing it with a print. Preferably, a filler is additionally worked into the outer layer in order to achieve better writability. At the same time, the SiO$_2$-containing outer layer shows a high degree of mattness, such that the film is given a paper-like appearance. The film provided with a writing has a density of about 0.69 g/cm$^2$. Due to its opacity it is, however, unsuitable for a number of purposes. When being printed, the matt, SiO$_2$-containing surface is unsatisfactory, for the colors exhibit a grey haze and non-uniform appearance. This is supposed to be due to inhomogeneities, which are not visible on the film alone because of its opacity, but which manifest themselves during printing.

Materials having a silk-matt appearance that have been predominantly employed hitherto are acetate films. However, preparation of these acetate films is associated with considerable environmental pollution. In addition, the stability of these materials in a moist environment is very unsatisfactory. There is therefore an increasing demand for the replacement of acetate films in the existing areas of application, it being desired for the substitute products to come as close as possible to the characteristic silk-matt appearance of acetate films.

SUMMARY OF THE INVENTION

It is therefore an object of the present invention to provide a multilayer film which has a silk-matt appearance on at least one surface. The haze and the sheen of the surface(s) should be optimized with respect to this desired silk-matt characteristic. Furthermore, a homogeneous optical appearance of the film, without any specks or striae is required. In addition, high and long-lasting surface tension of the outer layer is required so that good printability thereof is ensured. At the same time, any printing provided on the film should exhibit a uniform appearance.

Depending on the application, the film should, if desired, additionally have at least one outer layer with good heat-sealing properties, in particular a broad heat-sealing range and good heat-sealability. In addition, potential use on high-speed packaging machines requires good running properties and low friction.

In accordance with these and other objects of the invention, there is provided a multilayer polypropylene film comprising:

at least one base layer comprising polypropylene, and at least one outer layer comprising a mixture of components I and II, wherein mixture component I is selected from the group consisting of a propylene homopolymer, a copolymer of ethylene and propylene, a copolymer of ethylene and butylene, a copolymer of propylene or butylene, a copolymer of ethylene and another α-olefin having 5 to 10 carbon atoms, a copolymer of propylene and another α-olefin having 5 to 10 carbon atoms, a terpolymer of ethylene, propylene and butylene, a terpolymer of ethylene, propylene and another α-olefin having 5 to 10 carbon atoms, a mixture of two or more of said homopolymers, copolymers and terpolymers, and a blend of two or more of said homopolymers, copolymers and terpolymers that is optionally mixed with one or more of said homopolymers, copolymers and terpolymers, and wherein mixture component II is selected from the group consisting of an HDPE and a blend of two blend components A and B, in which blend component A consists essentially of an HDPE and blend component B consists essentially of a propylene homopolymer, a copolymer of ethylene and propylene, a copolymer of ethylene and butylene, a copolymer of propylene and butylene, a copolymer of ethylene and another α-olefin having 5 to 10 carbon atoms, a copolymer of propylene and another α-olefin having 5 to 10 carbon atoms, a terpolymer of ethylene, propylene and butylene, a terpolymer of ethylene, propylene and another α-olefin having 5 to 10 carbon atoms, a mixture of two or more of said homopolymers, copolymers and terpolymers, and a blend of two or more homopolymers, copolymers and terpolymers, and wherein the film has a silk-matt finish.

A process for the production of this multilayer polypropylene film comprises steps of coextruding melts corresponding to the individual layers of the film through a flat-film die; taking off the coextruded film over a take-off roll having a temperature between about 40° and about 100° C.; biaxially stretching the film at a longitudinal stretching ratio of from about 4:1 to about 7:1 and a transverse stretching ratio of from about 8:1 to about 10:1; thermofixing, and optionally corona-treating, the biaxially-stretched film; and winding up the thermofixed and optionally corona-treated film, wherein the film has at least one surface with a silk-matt finish.

Also provided are a packaging film comprising the multilayer film, an adhesive tape, comprising a base film of the a multilayer polypropylene film and an adhesive layer coated on the base film, an aqueous barrier coated film, comprising a base film of the multilayer polypropylene film and an aqueous barrier coating layer on the base film, and a laminate, comprising a base film of the multilayer polypropylene film and a layer selected from the group consisting of paper, cardboard, metal, metallized plastic and plastic laminated to the base film.

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE PREFERRED EMBODIMENTS

A multilayer film according to the invention has a mixture of two components in at least one outer layer.

Component I of the mixture is a polypropylene homopolymer or a copolymer made from α-olefins having 2 to 10 carbon atoms or a terpolymer made from α-olefins having 2 to 10 carbon atoms or a mixture of two or more of said homopolymers, copolymers and terpolymers or a blend of two or more of said homopolymers, copolymers and terpolymers.

Component II of the mixture is a high-density polyethylene (HDPE) or a blend of HDPE and one or more further polymers selected from the group consisting of polypropylene homopolymers, copolymers made from α-olefins having 2 to 10 carbon atoms, terpolymers made from α-olefins having 2 to 10 carbon atoms, and a blend of copolymers and terpolymers made from α-olefins having 2 to 10 carbon atoms.

The outer layer according to the invention is distinguished by a characteristic silk-matt-finish surface or appearance.

For the purpose of the present invention, mixtures are taken to mean mechanical mixtures prepared from the individual components. Generally, the individual constituents are poured together as compression moldings of small size, for example lenticular or spherical granules, and mechanically mixed using a suitable vibrating device.

For the purpose of the present invention, a blend is an alloy-like compound of the individual components which cannot be re-separated into to the original constituents. A blend has similar properties to a homogeneous material and can be characterized correspondingly by suitable parameters.

The base layer of the multilayer film according to the invention essentially comprises a propylene polymer and, if desired, additives, in amounts effective in each case. The polypropylene polymer contains predominantly (at least 90%) propylene and has a melting point of about 140° C. or above, preferably from about 150° to about 170° C. Isotactic homopolypropylene having an n-heptane-soluble content of about 6% by weight or less, based on the isotactic homopolypropylene, copolymers of ethylene and propylene having an ethylene content of about 5% by weight or less, and copolymers of propylene with $C_4$–$C_8$ α-olefins having an α-olefin content of about 5% by weight or less are preferred propylene polymers for the base layer, isotactic polypropylene being particularly preferred. The propylene polymer of the base layer generally has a melt flow index of from about 0.5 g/10 min to about 10 g/10 min, preferably from about 1.5 g/10 min to about 4 g/10 min, at 230° C. and a force of 21.6N (DIN 53 735). The percentages by weight indicated are based on the respective copolymer.

The structure of the base layer must not be changed by the additives incorporated in the base layer. In particular, the term "additives" here does not include any fillers. Fillers are customarily defined as particulate additives by which vacuole-like hollow spaces are generated in the layer. The film of the present invention possesses an essentially transparent, i.e., non-vacuole-containing, base layer.

At least one outer layer of the multilayer film according to the invention contains a mixture, described in greater detail below, of two components I and II and, if desired, additives.

Mixture component I of the outer layer mixture essentially comprises a propylene homopolymer or a copolymer of ethylene and propylene or ethylene and butylene or propylene and butylene or ethylene and another α-olefin having 5 to 10 carbon atoms or
propylene and another α-olefin having 5 to 10 carbon atoms, or a terpolymer of
ethylene and propylene and butylene or
ethylene and propylene and another α-olefin having 5 to 10 carbon atoms, or a mixture of two or more of said homopolymers, copolymers and terpolymers, or a blend of two or more of said homopolymers, copolymers and terpolymers, if desired mixed with one or more of said homopolymers, copolymers and terpolymers.

Mixture component I particularly preferably essentially comprises a propylene homopolymer or a copolymer of
ethylene and propylene or
ethylene and 1-butylene or
propylene and 1-butylene, or a terpolymer of
ethylene and propylene and 1-butylene, or a mixture of two or more of said particularly preferred homopolymers, copolymers and terpolymers, or a blend of two or more of said particularly preferred homopolymers, copolymers and terpolymers, if desired mixed with one or more said homopolymers, copolymers and terpolymers.

Particular preference is given to propylene homopolymers or random ethylene-propylene copolymers having an ethylene content of about 2 to about 10% by weight, preferably about 5 to about 8% by weight, or random propylene-1-butylene copolymers having a butylene content of from 4 about to about 25% by weight, preferably from about 10 to about 20% by weight, in each case based on the total weight of the copolymer, or random ethylene-propylene-1-butylene terpolymers having an ethylene content of from about 1 to about 10% by weight, preferably from about 2 to about 6% by weight and a 1-butylene content of from about 3 to about 20% by weight, preferably from about 8 to about 10% by weight, in each case based on the total weight of the terpolymer, or a blend of an ethylene-propylene-1-butylene terpolymer and a propylene-1-butylene copolymer having an ethylene content of from about 0.1 to about 7% by weight, a propylene content of from about 50 to about 90% by weight and a 1-butylene content of from about 10 to about 40% by weight, in each case based on the total weight of the polymer blend.

The propylene homopolymer employed as or in mixture component I comprises predominantly (at least 90%) propylene and has a melting point of about 140° C. or above, preferably from about 150° to about 170° C., isotactic homopolypropylene having an n-heptane-soluble content of about 6% by weight or less, based on the isotactic homopolypropylene, being preferred. The homopolymer of mixture component I or the homopolymer present therein generally has a melt flow index of from about 0.5 g/10 min to about 15 g/10 min, preferably from about 1.5 g/10 min to about 6 g/10 min, at 230° C. and a force of 21.6N (DIN 53 735).

Mixture component II of the outer layer mixture essentially comprises an HDPE or a blend essentially comprising HDPE as blend component A and a blend component B.

For the purpose of the present invention, HDPE is taken to mean high-pressure polyethylenes which have the following properties:

1. The melt flow index MFI, measured in accordance with DIN 53 735 or ISO 1133 at 50N/190° C., is in the range from about 0.2 to about 50 g/10 min, preferably it is greater than about 1 to about 45 g/10 min, and in particular it is about 5 to about 35 g/10 min.
2. The viscosity index, measured in accordance with DIN 53 728, Part 4, or ISO 1191, is in the range from about 100 to about 450 cm$^3$/g, preferably from about 120 to about 280 cm$^3$/g.
3. The crystallinity is from about 35 to about 80%, preferably from about 50 to about 80%.
4. The density, measured at 23° C. in accordance with DIN 53 479, Method A, or ISO 1183, is in the range from about 0.93 to about 0.97 g/cm$^3$, preferably from about 0.95 to about 0.96 g/cm$^3$.
5. The melting point, measured by DSC (melting curve maximum, heating rate 20° C./min), is between about 120° and about 150° C., preferably between about 125° and about 135° C.

The HDPE, as the sole mixture component or alternatively HDPE as blend component A, is selected from the polyethylenes described above, so that a suitable mixture component I is in principle the same HDPE as blend component A.

Blend component B essentially comprises a propylene homopolymer or a copolymer of
ethylene and propylene or
ethylene and butylene or
propylene and butylene or
ethylene and another α-olefin having 5 to 10 carbon atoms or
propylene and another α-olefin having 5 to 10 carbon atoms, or a terpolymer of
ethylene and propylene and butylene or
ethylene and propylene and another α-olefin having 5 to 10 carbon atoms, or a mixture of two or more of said homopolymers, copolymers and terpolymers, or a blend of two or more of said homopolymers, copolymers and terpolymers.

Blend component B particularly preferably essentially comprises a propylene homopolymer or a copolymer of
ethylene and propylene or
ethylene and 1-butylene or
propylene and 1-butylene, or a terpolymer of
ethylene and propylene and 1-butylene, or a mixture of two or more said particularly preferred homopolymers, copolymers and terpolymers, or a blend of two or more of said particularly preferred homopolymers, copolymers and terpolymers, particular preference being given to propylene homopolymers or random ethylene-propylene copolymers having an ethylene content of about 2 to about 10% by weight, preferably about 5 to about 8% by weight, or random propylene-1-butylene copolymers having a butylene content of from about 4 to about 25% by weight, preferably from about 10 to about 20% by weight, in each case based on the total weight of the copolymer, or random ethylene-propylene-1-butylene terpolymers having an ethylene content of from about 1 to about 10% by weight, preferably from about 2 to about 6% by weight and a 1-butylene content of from about 3 to about 20% by weight, preferably from about 8 to about 10% by weight, in each case based on the total weight of the terpolymer, or a blend of an ethylene-propylene-1-butylene terpolymer and a propylene-1-butylene copolymer having an ethylene content of from about 0.1 to about 7% by weight, a propylene content of from about 50 to about 90% by weight and a 1-butylene content of from about 10 to about 40% by weight, in each case based on the total weight of the polymer blend.

The propylene homopolymer employed as or in blend component B comprises predominantly (at least about 90%) propylene and has a melting point of about 140° C. or above, preferably from about 150° to about 170° C., isotactic homopolypropylene having an n-heptane-soluble content of about 6% by weight or less, based on the isotactic homopolypropylene, being preferred. The homopolymer of blend component B or the homopolymer present therein generally has a melt flow index of from about 0.5 g/10 min to about 15 g/10 min, preferably from about 1.5 g/10 min to about 6 g/10 min, at 230° C. and a force of 21.6N (DIN 53 735).

The ratio (weight ratio) of the two blend components A and B is between A:B=20:80 and A:B=80:20, preferably between A:B=40:60 and A:B=60:40, and is particularly preferably A:B=45:55.

The blend of components A and B has a melt flow index (DIN 53 735 at 230° C. and a load at 21.6N) of from about 1.5 g/10 min to about 12 g/10 min, preferably from about 2.5 g/10 min to about 6 g/10 min, the melt flow index of the blend preferably being higher than that of the propylene polymer of the base layer.

The melting range of the blend is between about 100° and about 160° C., preferably between about 120° and about 150° C.

The ratio (weight ratio) of the two mixture components I and II of the outer layer mixture can vary between broad limits and depends on the intended application of the multilayer film. The ratio of the mixture components I and II is preferably in a range of from I:II=10:90 to I:II=90:10, preferably between I:II=30:70 and I:II=70:30, in particular I:II= 50:50.

The multilayer film according to the invention comprises at least the above-described base layer and at least one silk-matt-finish outer layer which contains the above-described mixture. Depending on its intended application, the multilayer film may have a further outer layer on the opposite side. If desired, one or more intermediate layer(s) can be applied between the base layer and the outer layer(s).

The structure, thickness and composition of a second outer layer can be selected independently of the silk-matt-finish outer layer according to the invention which is already present. Preferred embodiments of the multilayer film are three-layered, it being possible for the second outer layer likewise to contain one of the mixtures described above, but it need not be identical with that of the first outer layer. However, the second outer layer may also contain any other customary outer layer polymer.

The thickness of the outer layer(s) is greater than 0.4 μm and is preferably in the range from about 0.8 to about 4 μm, in particular from about 1 to about 3 μm, it being possible for the outer layers on both sides to have identical or different thicknesses.

The overall thickness of the multilayer polyolefin film according to the invention can vary within broad limits and depends on the intended application. It is preferably from about 5 to about 70 μm, in particular from about 10 to about 50 μm, the base layer making up for about 50 to about 90% of the overall film thickness.

The film according to the present invention has a density of at least 0.88 g/cm$^3$, preferably of 0.90 g/cm$^3$ to 0.92 g/cm$^3$.

Surprisingly, it was found that even without vacuole-containing fillers in their base layers, the films according to the present invention have haze values which are clearly increased over known transparent films. As a matter of fact, disappearance of the opacifying vacuoles in the base layer had to be expected without fillers, but the hazy appearance of the film was completely unforeseeable.

Furthermore, it was surprising to discover that a film having a very homogeneous optical appearance and possessing the desired, silk-matt characteristic was obtained by incorporating the above-described polyethylenes into an outer layer comprised of a homo-, co- or terpolymer of propylene. This result is even more surprising in view of the fact that tests based on the film disclosed in EP 0 367 613 did not lead to the desired result. When the film described in the publication was reworked without the addition of fillers to its base layer, a film was obtained having a base layer that was no longer vacuole-containing, i.e., was no longer opaque, but which looked spotty instead of exhibiting the desired silk-matt appearance. Some areas of the film had a haze of less than 10, whereas in other areas a haze of more than 10 was measured (according to ASTM D 1003). The sheen values were of similar irregularity. It was not possible to produce a film having a sheen, haze and regularity satisfying the demand for the required "silk-matt" appearance.

In order to improve the adhesion properties of the outer layer(s), at least one surface of the film is corona- or flame-treated, it being possible, if appropriate, for the corresponding treatment to be carried out on both surfaces.

In order to improve further specific properties of the polyolefin film according to the invention, both the base layer and the outer layer(s) may contain further additives in an amount effective in each case, preferably antistatics and/or antiblocking agents and/or lubricants and/or stabilizers and/or neutralizers, which are compatible with the polymers of the base layer and of the outer layer(s). All amount data hereinafter in percent by weight (% by weight) are in each case based on the layer or layers to which the additive can be added.

Preferred antistatics are alkali metal alkanesulfonates, polyether-modified, i.e. ethoxylated and/or propoxylated polydiorganosiloxanes (polydialkylsiloxanes, polyalkylphenylsiloxanes and the like) and/or essentially straight-chain and saturated aliphatic, tertiary amines containing an aliphatic radical having 10 to 20 carbon atoms which are substituted by ω-hydroxy-($C_1$–$C_4$)alkyl groups, N,N-bis(2-hydroxyethyl)alkylamine having 10 to 20 carbon atoms, preferably 12 to 18 carbon atoms, in the alkyl radical being particularly suitable. The effective amount of antistatic is in the range from about 0.05 to about 0.3% by weight. In addition, glycerol monostearate is preferably employed as antistatic in an amount of from about 0.03% to about 0.2%.

Lubricants are higher aliphatic acid amides, higher aliphatic acid esters, waxes and metal soaps and polydimethylsiloxanes. The effective amount of lubricant is in the range from about 0.1 to about 3% by weight. Particularly suitable is the addition of higher aliphatic acid amides in the range from about 0.15 to about 0.25% by weight in the base layer and/or the outer layers. A particularly suitable aliphatic acid amide is erucamide.

The addition of polydimethylsiloxanes is preferred in the range from about 0.3 to about 2.0% by weight, in particular polydimethylsiloxanes having a viscosity of from about 10,000 to about 1,000,000 mm$^2$/s. Particularly favorable is the addition of polydimethylsiloxanes in one or both outer layers.

Stabilizers which can be employed are conventional compounds which have a stabilizing action for polymers of ethylene, propylene and other α-olefins. Their added amount is between about 0.05 and about 2% by weight. Particularly suitable are phenolic stabilizers, alkali metal or alkaline earth metal stearates and/or alkali metal or alkaline earth metal carbonates.

Phenolic stabilizers are preferred in an amount of from about 0.1 to about 0.6% by weight, in particular from 0.15 to 0.3% by weight, and having a molecular weight of greater than about 500 g/mol. Pentaerythrityl tetrakis[3-(3,5-di-tert.-butyl-4-hydroxyethyl) propionate] and 1,3,5-trimethyl-2,4,6-tris(3,5-di-tert-butyl- 4-hydroxybenzyl)benzene are particularly advantageous.

Suitable antiblocking agents are inorganic additives such as silicon dioxide, calcium carbonate, magnesium silicate, aluminum silicate, calcium phosphate and the like and/or incompatible organic polymers such as polyamides, polyesters, polycarbonates and the like. Preference is given to benzoguanamine-formaldehyde polymers, silicon dioxide and calcium carbonate. The effective amount of antiblocking agent is in the range from about 0.1 to about 2% by weight, preferably from about 0.1 to about 0.5% by weight. The mean particle size is between about 1 and about 6 μm, in particular about 2 and about 5 μm, particles having a spherical shape, as described in EP-A-0 236 945 and DE-A-38 01 535, being particularly suitable. The antiblocking agents are preferably added to the outer layers.

Neutralizers are preferably calcium stearate and/or calcium carbonate having a mean particle size of at most about 0.7 μm, an absolute particle size of less than about 10 μm and a specific surface area of at least about 40 m$^2$/g.

The invention furthermore relates to a process for the production of a multilayer film according to the invention by a coextrusion process, which is known per se. Melts corresponding to the individual layers of the film are coextruded through a flat-film die, the resultant film is drawn off over one or more rolls for solidification, the film is subsequently biaxially stretched (oriented), and the biaxially-stretched film is thermofixed and, if desired, corona-treated on the surface layer intended for corona treatment.

The biaxial stretching (orientation) can be carried out simultaneously or consecutively, consecutive biaxial stretching, in which stretching is carried out first longitudinally (in the machine direction) and then transversely (perpendicular to the machine direction), being preferred.

First, as is customary in coextrusion, the polymer or polymer mixture of the individual layers is compressed and liquefied in an extruder, it being possible for any additives added to be already present in the polymer or in the polymer mixture. The melts are then pressed simultaneously through a flat-film die (slot die), and the extruded multilayer film is drawn off over one or more take-off rolls, where it cools and solidifies.

The resultant film is then stretched longitudinally and transversely to the extrusion direction, which results in alignment of the molecule chains. Stretching is preferably from about 4:1 to about 7:1 in the longitudinal direction and preferably from about 8:1 to about 10:1 in the transverse direction. The longitudinal stretching is expediently carried out with the aid of two rolls running at different speeds corresponding to the desired stretching ratio, and the transverse stretching is expediently carried out with the aid of an appropriate tenter frame.

Biaxial stretching of the film is followed by thermofixing (heat treatment), the film being kept at a temperature of from about 140° to about 160° C. for about 0.5 to about 10 seconds. The film is subsequently wound up in the conventional manner by means of a wind-up unit.

It has proven particularly favorable to keep the take-off roll or rolls, by means of which the extruded film is also cooled and solidified, at a temperature of from about 40° to about 100° C., preferably from about 40° to about 60° C., by a heating and cooling circuit.

The temperatures at which longitudinal and transverse stretching are carried out can vary in a relatively broad range and depend on the respective composition of the outer layer mixture. In general, the longitudinal stretching is preferably carried out at from about 120° to about 150° C. and the transverse stretching preferably at from about 155° to about 190° C.

If desired, one or both surfaces of the film can, as mentioned above, be corona- or flame-treated by one of the known methods after the biaxial stretching. Corona treatment expediently is performed by passing the film between two conductor elements serving as electrodes, and applying a high voltage, usually alternating voltage (from about 10 to 20 kV and from about 20 to about 40 kHz) between the electrodes so that spray or corona discharges can occur. The spray or corona discharge ionizes the air above the film surface and reacts with the molecules of the film surface, causing formation of polar inclusions in the essentially non-polar polymer matrix.

For flame treatment with a polarized flame (cf. U.S. Pat. No. 4,622,237), a direct electric voltage is applied between a burner (negative pole) and a chill roll. The level of the applied voltage is between about 500 and about 3,000 V, preferably in the range from about 1,500 to about 2,000 V. The applied voltage gives the ionized atoms increased acceleration, and they hit the polymer surface with greater kinetic energy. The chemical bonds within the polymer molecule are more easily broken, and formation of free radicals proceeds more rapidly. Heating of the polymer here is substantially less than in the case of standard flame treatment, and films can be obtained in which the heat-sealing properties of the treated side are even better than those of the untreated side.

The multilayer film according to the invention is distinguished by a characteristic silk-matt sheen and an outstandingly homogeneous visual impression, which makes the film, surprisingly, highly suitable for the replacement of acetate films.

The silk-matt appearance differs from conventional matt films in a characteristic manner and is readily detectable by a person skilled in the relevant art. This silk-matt sheen is achieved by simultaneous optimization of sheen and haze of the film and is tested by the person skilled in the art by visual assessment.

Surprisingly, the films have the desired visual 'silk-matt' appearance when they have very regular optical properties and sheen and haze have low or high measured values, respectively, but are not at a minimum or maximum. It has been found that films having sheen values (at a measurement angle of 85°, measured in accordance with ASTM-D-523-

78) of less than about 80, preferably less than about 60, and a haze (measured in accordance with ASTM-D-1003) of greater than about 10, preferably greater than about 30, have a silk-matt appearance whereby the sheen and haze values for one specific embodiment vary within relatively narrow limits, i.e., the variations do not exceed 20%. This requirement is satisfied particularly well if the sheen is in the range from about 25 to about 45 (85°, ASTM-D-5237) and the haze is in the range from about 40 to about 80, preferably from about 50 to about 70. Thereby the overall variations across the total film in sheen and haze are less than about 10% and preferably are from about 1 to about 8%.

The silk-matt surface optimized in this way gives the film a paper-like appearance, which is particularly desirable for certain applications in the packaging sector. Surprisingly, it has been found that it is not minimization of sheen and maximization of haze which bring the desired optical effect, but instead a balanced optimization of the properties is necessary, which is possible, surprisingly, by means of the specific outer layer composition according to the invention.

At the same time, the multilayer film has excellent printability and is distinguished by a very high degree of homogeneity of the printed image. The surface tension is surprisingly high and does not drop significantly even after storage for a number of months. Furthermore, the films according to the invention have decidedly unusual heat-sealing properties. These can be adjusted individually for the particular problem and the intended application. This flexibility opens up an extremely broad range of applications of the same material in a wide variety of areas. The choice of the individual components for the outer layer mixture and their ratio allows the heat-sealing initiation temperatures, which can be varied over a broad range, to be set specifically. Also variable is the sealing seam strength, which, for many applications, should be on the high side. However, the film according to the invention is also intended for novel applications in which high sealing seam strength is disadvantageous. For example, conventional lid closures made of aluminum are increasingly being replaced by other materials in order to improve their recyclability by means of uniform packaging made from a single class of substances. These lids are heat-sealed to the container to be sealed, and should subsequently be removable without difficulty. This application requires a lower sealing seam strength.

In addition, the film has a good barrier action against water vapor. This property is particularly important for use as a lid closure material in order effectively to protect the contents against loss of moisture.

In summary, it may be stated that the multilayer film according to the invention is distinguished by a multiplicity of advantageous properties, in particular by a characteristic silk-matt sheen of less than about 80 at a measurement angle of 85° (ASTM-D- 523-78), optimized haze of greater than about 10 (ASTM-D-1003), a particularly homogeneous visual appearance, high surface roughness, a relatively small coefficient of friction, a good water-vapor barrier action, good short-term and long-term printability, high surface tension, good long-term stability of the surface tension, and unusual sealing seam properties, i.e., in particular, heat-sealing initiation temperatures and sealing seam strengths which can be set specifically.

This surprising multiplicity of excellent properties provides, according to the invention, a film that is highly suitable as a replacement material for acetate films in conventional areas of application. In addition, it can equally well be employed for a very wide variety of applications, in particular as an attractive matt lamination film, as a packaging film on high-speed packaging machines, as a novel lid closure material and as a matt cigarette wrapping film if the surface treatment is omitted.

In addition, the film is highly suitable as a base film for adhesive tape (with long-term stability and high surface tension) or as a base film for aqueous barrier coating systems, for example, based on aqueous dispersions of polyvinylidene chloride or ethyl-vinyl alcohol copolymers. It can, for various purposes, be printed with aqueous printing inks, in which application it has excellent short-term and long-term printability. Due to its good immediate and long-term coatability, the film is also suitable for the production of laminates with paper, cardboard, metals, metallized plastic films and plastic films.

The invention is now described in greater detail with reference to working examples.

TABLE 1

(Examples 1 to 11)

| | Mixture component I | Mixture component II | I:II |
|---|---|---|---|
| E1 | $C_3$-homopolymer | HDPE + $C_3$-homopolymer | 50:50 |
| E2 | $C_2/C_3$-copolymer | HDPE + $C_3$-homopolymer | 50:50 |
| E3 | $C_2/C_3$-copolymer | HDPE + $C_3$-homopolymer | 70:30 |
| E4 | Tafmer | HDPE + $C_2/C_3$-copolymer | 60:40 |
| E5 | $C_2/C_3$-copolymer | HDPE + $C_2/C_3$-copolymer | 50:50 |
| E6 | $C_2/C_3$-copolymer | HDPE + $C_2/C_3$-copolymer | 70:30 |
| E7 | $C_2/C_3$-copolymer | HDPE + $C_2/C_3/C_4$-terpolymer | 50:50 |
| E8 | $C_2/C_3$-copolymer | HDPE + $C_2/C_3/C_4$-terpolymer | 70:30 |
| E9 | $C_2/C_3$-copolymer | HDPE + Tafmer | 50:50 |
| E10 | $C_2/C_3/C_4$-terpolymer | HDPE + Tafmer | 50:50 |
| E11 | $C_2/C_3/C_4$-terpolymer | HDPE + $C_2/C_3/C_4$-terpolymer | 50:50 |
| E12 | $C_2$-homopolymer | HDPE | 50:50 |
| E13 | $C_2/C_3$-copolymer | HDPE | 50:50 |
| E14 | $C_2/C_3$-copolymer | HDPE | 70:30 |
| E15 | $C_2/C_3/C_4$-terpolymer | HDPE | 50:50 |
| E16 | $C_2/C_3/C_4$-terpolymer | HDPE | 70:30 |

E = Example

EXAMPLE 1

A three-layer film with a thickness of 1 mm with an XZX layer structure, i.e., the base layer Z is surrounded by two identical outer layers X, is extruded by the coextrusion process from a flat-film die at an extrusion temperature of 260° C.

The base layer essentially comprises a polypropylene homopolymer having an n-heptane-soluble content of 4.5% by weight and a melting point of 165° C. The melt flow index of the polypropylene homopolymer is 3.2 g/10 min at 230° C. and a load of 21.6N (DIN 53 735).

The two outer layers X essentially comprise a mechanical mixture of mixture components I and II in the ratio I:II= 50:50. Mixture component I comprises a polypropylene homopolymer having an n-heptane-soluble content of 4.5% by weight and a melting point of 165° C. The melt flow index of the polypropylene homopolymer is 6.0 g/10 min at 230° C. and a load of 21.6N (DIN 53 735).

Mixture component II comprises a blend of two components A and B in the ratio A:B=50:50. Component A comprises an HDPE having an MFI (50N/190° C.) of 11 g/10 min (measured in accordance with DIN 53 735), a viscosity index of 160 cm³/g (measured in accordance with DIN 53 728, Part 4), a density of 0.954 g/cm³ (measured in accordance with DIN 53 479, Method A), a degree of crystallinity of 68% and a melting point of 132° C. according to DSC measurement. Component B comprises a polypropylene homopolymer having an n-heptane-soluble content of 4.5% by weight and a melting point of 165° C. The melt flow index of component B is 7.0 g/10 min at 230° C. and a load of 21.6N (DIN 53 735).

Mixture components I and II are mixed mechanically in the ratio I:II=50:50 in a Henschel mixture for 2 minutes at 500 rpm, giving a homogeneous mixture of granules.

For stabilization, all layers contain 0.12% by weight of pentaerythritol tetrakis[4-(3,5-di-tert.-butyl-4-hydroxyphenyl)[ propionate] (®Irganox 1010) and, as neutralizer, 0.06% by weight of calcium stearate. The base layer furthermore contains 0.15% by weight of N,N-bis-(2-hydroxyethyl)($C_{10}$–$C_{20}$)alkylamine (®Armostat 300) as an antistatic.

After coextrusion, the extruded three-layer film is taken off via a first take-off roll and a further trio of rolls and is cooled, subsequently stretched longitudinally, stretched transversely, fixed and corona-treated, the following conditions, in detail, being selected:

| Extrusion: | Extrusion temperature 260° C. |
|---|---|
| | Temperature of the first take-off roll 50° C. |
| | Temperature of the trio of rolls 50° C. |
| Longitudinal stretching: | Stretching roll T = 125° C. |
| | Longitudinal stretching by a factor of 5 |
| Transverse stretching: | Heat-up zone T = 175° C. |
| | Stretching zone T = 165° C. |
| | Transverse stretching by a factor of 10 |
| Fixing: | Temperature T = 155° C. |
| Corona treatment: | Voltage: 10,000 V |
| | Frequency: 10,000 Hz. |

The multilayer film produced in this way has a silk-matt surface on both sides and has, immediately after production, a surface tension of from 40 to 41 mN/m.

The film is about 21.5 μm thick, the base layer having a thickness of 19 μm and each outer layer having a thickness of 1.25 μm.

EXAMPLE 2

Example 1 is repeated. Mixture component I comprises a random ethylene-propylene copolymer having an ethylene content of 5% by weight, based on the weight of the copolymer. The melting point of the copolymer is 134° C., and the melt flow index is 7.0 g/10 min. The water-vapor barrier action in this working example is 1.78 g m$^{-1}$ d$^{-1}$ at a film thickness of 16 μm.

EXAMPLE 3

Example 2 is repeated. The mixing ratio of the two mixture components I and II is I:II=70:30.

EXAMPLE 4

Example 1 is repeated. Mixture component I comprises a polymer blend of an ethylene-propylene-1-butylene terpolymer and a propylene-1-butylene copolymer corresponding to a content of 0.7% by weight of ethylene, 81.3% by weight of propylene and 18% by weight of butylene, based on the polymer blend. Mixture component [I comprises a blend of two components A and B in the ratio A:B=50:50. Component A comprises an HDPE having an MFI (50N/190° C.) of 11 g/10 min (measured in accordance with DIN 53 735), a viscosity index of 160 cm³/g (measured in accordance with DIN 53 728, Part 4), a density of 0.954 g/cm³ (measured in accordance with DIN 53 479, Method A), a degree of crystallinity of 68% and a melting point of 132° C. according to DSC measurement. Component B comprises a random ethylene-propylene copolymer having an ethylene content of 5% by weight, based on the weight of the copolymer. The melting point of the copolymer is 134° C. and the melt flow index is 7 0 g/10 min. The mixing ratio of the two mixture components I and II is I:II=60:40.

EXAMPLE 5

Example 4 is repeated. Mixture component I comprises a random ethylene-propylene copolymer having an ethylene content of 5% by weight, based on the weight of the copolymer. The melting point of the copolymer is 134° C. and the melt flow index is 7.0 g/10 min. The mixing ratio of the two mixture components I and II is I:II= 50:50.

EXAMPLE 6

Example 5 is repeated. The mixing ratio of the two mixture components I and II is I:II=70:30.

EXAMPLE 7

Example 5 is repeated. Mixture component II comprises a blend of two components A and B in the ratio A:B=50:50. Component A comprises an HDPE having an MFI (50N/190° C.) of 11 g/10 min (measured in accordance with DIN 53 735), a viscosity index of 160 cm³/g (measured in accordance with DIN 53 728, Part 4), a density of 0.954 g/cm³ (measured in accordance with DIN 53 479, Method A), a degree of crystallization of 68% and a melting point of 132° C. according to DSC measurement. Component B comprises a terpolymer of ethylene, propylene and 1-butylene units having an ethylene content of 1.9% by weight and a 1-butylene content of 8.4% by weight, based on the terpolymer.

EXAMPLE 8

Example 7 is repeated. The mixing ratio of the two mixture components I and II is I:II=70:30.

EXAMPLE 9

Example 5 is repeated. Mixture component II comprises a blend of two components A and B in the ratio A:B=50:50. Component A comprises an HDPE having an MFI (50N/190° C.) of 11 g/10 min (measured in accordance with DIN 53 735), a viscosity index of 160 cm³/g (measured in accordance with DIN 53 728, Part 4), a density of 0.954 g/cm³ (measured in accordance with DIN 53 479, Method A), a degree of crystallization of 68% and a melting point of 132° C. according to DSC measurement. Component B comprises a polymer blend of an ethylene-propylene-1-butylene terpolymer and a propylene-1-butylene copolymer corresponding to a content of 0.7% by weight of ethylene, 81.3% by weight of propylene and 18% by weight of butylene, based on the polymer blend.

EXAMPLE 10

Example 9 is repeated. Mixture component I comprises a terpolymer of ethylene, propylene and 1-butylene units having an ethylene content of 1.9% by weight and a 1-butylene content of 8.4% by weight, based on the terpolymer.

EXAMPLE 11

Example 7 is repeated. Mixture component I comprises a terpolymer of ethylene, propylene and 1-butylene units having an ethylene content of 1.9% by weight and a 1-butylene content of 8.4% by weight, based on the terpolymer.

EXAMPLE 12

Example 1 is repeated. Mixture component II comprises pure HDPE having an MFI (50N/190° C.) of 11 g/10 min (measured in accordance with DIN 53 735), a viscosity index of 160 cm³/g (measured in accordance with DIN 53 728, Part 4), a density of 0.954 g/cm³ (measured in accordance with DIN 53 479, Method A), a degree of crystallization of 68% and a melting point of 132° C. according to DSC measurement.

EXAMPLE 13

Example 2 is repeated. Mixture component II corresponds to that in Example 12.

EXAMPLE 14

Example 3 is repeated. Mixture component II corresponds to that in Example 12.

EXAMPLE 15

Example 11 is repeated. Mixture component II corresponds to that of Example 12.

Example 15 is repeated. The mixing ratio of the two mixture components I and II is I:II=70:30.

The raw materials and the films were characterized using the following measurement methods:

Melt flow index

The melt flow index was measured in accordance with DIN 53 735 at 230° C. with a load of 21.6N or at 190° C. with a load of 50N.

Melting Point

DSC measurement, maximum of the melting curve, heating rate 20° C./min.

Viscosity Index J

The viscosity index is a measure of the molecular weight. The viscosity index is measured in accordance with DIN 53 728, Part 4, in 0.1% strength decahydronaphthaline solution at 135° C.

Density σ

The density is determined in accordance with DIN 53 479, Method A.

Degree of crystallization α

The degree of crystallization can be determined from the following relationship:

$$\alpha = \frac{\sigma - \sigma_{amorphous}}{\sigma_{crystalline} - \sigma_{amorphous}} \cdot 100\%$$

where $\sigma_{amorphous} = 0.8549$ g/cm³

$\sigma_{crystalline} = 1.0005$ g/cm³

σ=density of the HDPE grade employed

Haze

The haze of the film was measured in accordance with ASTM-D 1003-52.

Sheen

The sheen was determined in accordance with DIN 67 530. The reflector value was measured as an optical parameter for the surface of a film. In accordance with the standards ASTM-D 523-078 and ISO 2813, the incident angle was set at 60° or 85°. A light beam hits the planar test surface at the set incident angle and is reflected or scattered thereby. The light beams incident on the photoelectronic receiver are indicated as a proportional electrical quantity. The measurement value is dimensionless and must be specified together with the incident angle.

Sealing Seam Strength

For the determination, two film strips 15 mm in width were placed one on top of the other and heat-sealed at 130° C., at a sealing time of 0.5 second and at a sealing pressure of 10 mm² (equipment: Brugger NDS, heat-sealing jaws heated on one side). The sealing seam strength was determined by the T-peel method.

Roughness

The roughness was determined in accordance with DIN 4768.

Friction

The friction was determined in accordance with DIN 53 375.

Surface Tension

The surface tension was determined by the ink method (DIN 53 364).

Printability

The corona-treated films were printed 14 days after production (short-term assessment) and 6 months after production (long-term assessment). The ink adhesion was assessed by an adhesive-tape test. If little ink is removable by means of an adhesive tape, the ink adhesion was assessed as being moderate, and if a significant amount of ink was removed, it was assessed as being poor.

Water-vapor Barrier Action

The water-vapor barrier action is measured in accordance with DIN 53 122 at 23° C. and 85% relative atmospheric humidity and indicates the amount of water in grams which has passed through per square meter and per day.

The table below summarizes the properties of the polyolefin films of the examples and comparative examples.

TABLE 2

| Example | Sheen (ASTM D-523-78) Measurement Angle 85% | Haze (ASTM 1003) % | Roughness (c.o. 0.25 mm) μm | Coefficient of Friction — | Surface Tension After Storage for 6 Months mN/m | Visual Assessment of the Silk-Matt Appearance (++ = very good) | Sealing Seam Strength (130° C., 0.5 s, 10N/cm³) N/15 mm |
|---|---|---|---|---|---|---|---|
| E1 | 40 | 60 | 2.5 | 0.5 | 38 | ++ | — |
| E2 | 32 | 66 | 3.0 | 0.4 | 39 | ++ | 0.6 |
| E3 | 42 | 58 | 2.3 | 0.5 | 39 | ++ | 1.2 |
| E4 | 38 | 62 | 2.6 | 0.4 | 39 | ++ | 3.0 |
| E5 | 30 | 68 | 3.2 | 0.3 | 39 | ++ | 1.6 |
| E6 | 38 | 63 | 2.6 | 0.4 | 39 | ++ | 1.8 |
| E7 | 32 | 65 | 2.9 | 0.4 | 39 | ++ | 2.2 |
| E8 | 38 | 62 | 2.7 | 0.4 | 39 | ++ | 2.4 |
| E9 | 34 | 63 | 3.3 | 0.4 | 39 | ++ | 2.3 |
| E10 | 36 | 62 | 2.6 | 0.4 | 39 | ++ | 2.8 |
| E11 | 35 | 62 | 2.6 | 0.4 | 39 | ++ | 2.5 |
| E12 | 31 | 69 | 3.0 | 0.4 | 38 | ++ | — |
| E13 | 29 | 70 | 3.2 | 0.3 | 39 | ++ | 2.0 |
| E14 | 32 | 66 | 2.9 | 0.3 | 39 | ++ | 2.2 |
| E15 | 30 | 68 | 3.0 | 0.3 | 39 | ++ | 2.4 |
| E16 | 34 | 64 | 2.8 | 0.4 | 39 | ++ | 2.8 |

What is claimed is:

1. A multilayer polypropylene film comprising:

at least one base layer comprising polypropylene, and at least one outer layer comprising a mixture of components I and II, wherein mixture component I is selected from the group consisting of a propylene homopolymer, a copolymer of ethylene and propylene, a copolymer of ethylene and butylene, a copolymer of propylene or butylene, a copolymer of ethylene and another α-olefin having 5 to 10 carbon atoms, a copolymer of propylene and another α-olefin having 5 to 10 carbon atoms, a terpolymer of ethylene, propylene and butylene, a terpolymer of ethylene, propylene and another α-olefin having 5 to 10 carbon atoms, a mixture of two or more of said homopolymers, copolymers and terpolymers, and a blend of two or more of said homopolymers, copolymers and terpolymers that is optionally mixed with one or more of said homopolymers, copolymers and terpolymers, and wherein mixture component II is selected from the group consisting of (i) an HDPE and (ii) a blend of two blend components A and B, in which blend component A consists essentially of an HDPE and blend component B consists essentially of a propylene homopolymer, a copolymer of ethylene and propylene, a copolymer of ethylene and butylene, a copolymer of propylene and butylene, a copolymer of ethylene and another α-olefin having 5 to 10 carbon atoms, a copolymer of propylene and another α-olefin having 5 to 10 carbon atoms, a terpolymer of ethylene, propylene and butylene, a terpolymer of ethylene, propylene and another α-olefin having 5 to 10 carbon atoms, a mixture of two or more of said homopolymers, copolymers and terpolymers, and a blend of two or more homopolymers, copolymers and terpolymers, and wherein the film has a silk-matt finish having a sheen value of less than about 80 at a measurement angle of 85°, measured in accordance with ASTM-D-523-78 and a haze of greater than about 30, measured in accordance with ASTM-D-1003.

2. A multilayer polypropylene film as claimed in claim 1, wherein mixture component I is selected from the group consisting of a propylene homopolymer, a copolymer of ethylene and propylene, a copolymer of ethylene and 1-butylene, a copolymer of propylene and 1-butylene, a terpolymer of ethylene and propylene and 1-butylene, a mixture of two or more said homopolymers, copolymers and terpolymers, and a blend of two or more said homopolymers, copolymers and terpolymers, if desired mixed with one or more of said homopolymers, copolymers and terpolymers.

3. A multilayer polypropylene film as claimed in claim 1, wherein mixture component I is selected from the group consisting of a propylene homopolymer, a random ethylene-propylene copolymer having an ethylene content of 2 to 10% by weight, a random propylene-1-butylene copolymer having a butylene content of from 4 to 25% by weight, in each case based on the total weight of the copolymer, a random ethylene-propylene-1-butylene terpolymer having an ethylene content of from 1 to 10% by weight, and a 1-butylene content of from 3 to 20% by weight, in each case based on the total weight of the terpolymer, and a blend of an ethylene-propylene-1-butylene terpolymer and a propylene-1-butylene copolymer having an ethylene content of from 0.1 to 7% by weight, a propylene content of from 50 to 90% by weight and a 1-butylene content of from 10 to 40% by weight, in each case based on the total weight of the polymer blend.

4. A multilayer polypropylene film as claimed in claim 2, wherein blend component B is selected from the group consisting of a propylene homopolymer, a copolymer of ethylene and propylene, a copolymer of ethylene and 1-butylene, a copolymer of propylene and 1-butylene, a terpolymer of ethylene and propylene and 1-butylene, a mixture of two or more of said homopolymers, copolymers and terpolymers, and a blend of two or more of said particularly preferred homopolymers, copolymers and terpolymers.

5. A multilayer polypropylene film as claimed in claim 3, wherein blend component B is selected from the group consisting of a propylene homopolymer, or a random ethylene-propylene copolymer having an ethylene content of 2 to 10% by weight and a random propylene-1-butylene copolymer having a butylene content of from 4 to 25% by weight, in each case based on the total weight of the copolymer, a random ethylene-propylene-1-butylene terpolymer having an ethylene content of from 1 to 10% by weight and a 1-butylene content of from 3 to 20% by weight, in each case based on the total weight of the terpolymer, and a blend of an ethylene-propylene-1-butylene terpolymer and a propylene-1-butylene copolymer having an ethylene content of from 0.1 to 7% by weight, a propylene content of from 50 to 90% by weight and a 1-butylene content of from 10 to 40% by weight, in each case based on the total weight of the polymer blend.

6. A multilayer polypropylene film as claimed in claim 1, wherein the HDPE has a melt flow index measured in accordance with DIN 53 735 with a load of 50N at 190° C., of from 0.2 to 50 g/10 min, a viscosity index, measured in accordance with DIN 53 728, Part 4, of from 100 to 450 cm$^3$/g, a density, measured in accordance with DIN 53 479, Method A, of from 0.93 to 0.97 g/cm$^3$, a degree of crystallization of from 35° to 80°, and a melting point of from 120° to 150° C. according to DSC measurement.

7. A multilayer polypropylene film as claimed in claim 1, wherein the ratio between blend components A and B is in the range from A:B=20:80 to A:B=80:20.

8. A multilayer polypropylene film as claimed in claim 1, wherein the ratio between blend components A and B is in the range from A:B=40:60 to A:B=60:40.

9. A multilayer polypropylene film as claimed in claim 1, wherein the blend has a melt flow index of from 1.5 to 12 g/10 min, measured at 230° C. with a load of 21.6 N.

10. A multilayer polypropylene film as claimed in claim 1, wherein the blend has a melt flow index of from 2.5 to 6 g/10 min, measured at 230° C. with a load of 21.6 N.

11. A multilayer polypropylene film as claimed in claim 1, wherein the ratio between mixture components I and II is in the range from I:II=90:10 to I:II=10:90.

12. A multilayer polypropylene film as claimed in claim 1, wherein the polypropylene polymer of the base layer has a melting point of at least 140° C. and the melt flow index is in the range from 0.5 to 15 g/10 min.

13. A multilayer polypropylene film as claimed in claim 1, wherein the outer layer and the base layer contains as an additive, one or more members selected from the group consisting of an antistatic agent, an antiblocking agent, a lubricant, a stabilizer and a neutralizer.

14. A multilayer polypropylene film as claimed in claim 1, wherein said surface having a silk-matt finish has a sheen of from about 25 to about 45, measured in accordance with ASTM-D 523-78 at a measurement angle of 85°.

15. A multilayer polypropylene film as claimed in claim 14, wherein said film has a haze of from about 40 to about 80, measured in accordance with ASTM-D 1003.

16. A packaging comprising a multilayer film as claimed in claim 1.

17. An aqueous barrier coated film, comprising:

a base film of a multilayer polypropylene film as claimed in claim 1; and an aqueous barrier coating layer on said base film.

18. A laminate, comprising:

a base film of a multilayer polypropylene film as claimed in claim 1; and a layer selected from the group consisting of paper, cardboard, metal, metallized plastic and plastic laminated to said base film.

19. A multilayer polypropylene film as claimed in claim 1, wherein the outer layer or the base layer contains as an additive, one or more members selected from the group consisting of an antistatic agent, an antiblocking agent, a lubricant, a stabilizer and a neutralizer.

* * * * *

UNITED STATES PATENT AND TRADEMARK OFFICE
CERTIFICATE OF CORRECTION

PATENT NO. : 5,474,820
DATED : December 12, 1995
INVENTOR(S) : MURSCHALL, et al.

It is certified that error appears in the above-indentified patent and that said Letters Patent is hereby corrected as shown below:

On the title page, item [75] should read as follows:

Inventors:    Ursula Murschall, Nierstein; Angela Speith, Wiesbaden; Gunter Schloegl, Kelkheim, all of the Federal Republic of Germany Signed and Sealed this Eleventh Day of June, 1996

*Attest:*

BRUCE LEHMAN

*Attesting Officer*      *Commissioner of Patents and Trademarks*